Nov. 14, 1939.     G. R. DEMPSTER     2,179,779
TRANSPORTING AND DUMPING VEHICLE
Filed Aug. 5, 1938      2 Sheets-Sheet 1

Inventor
George R. Dempster.
By Cameron, Kerkam & Sutton
Attorneys

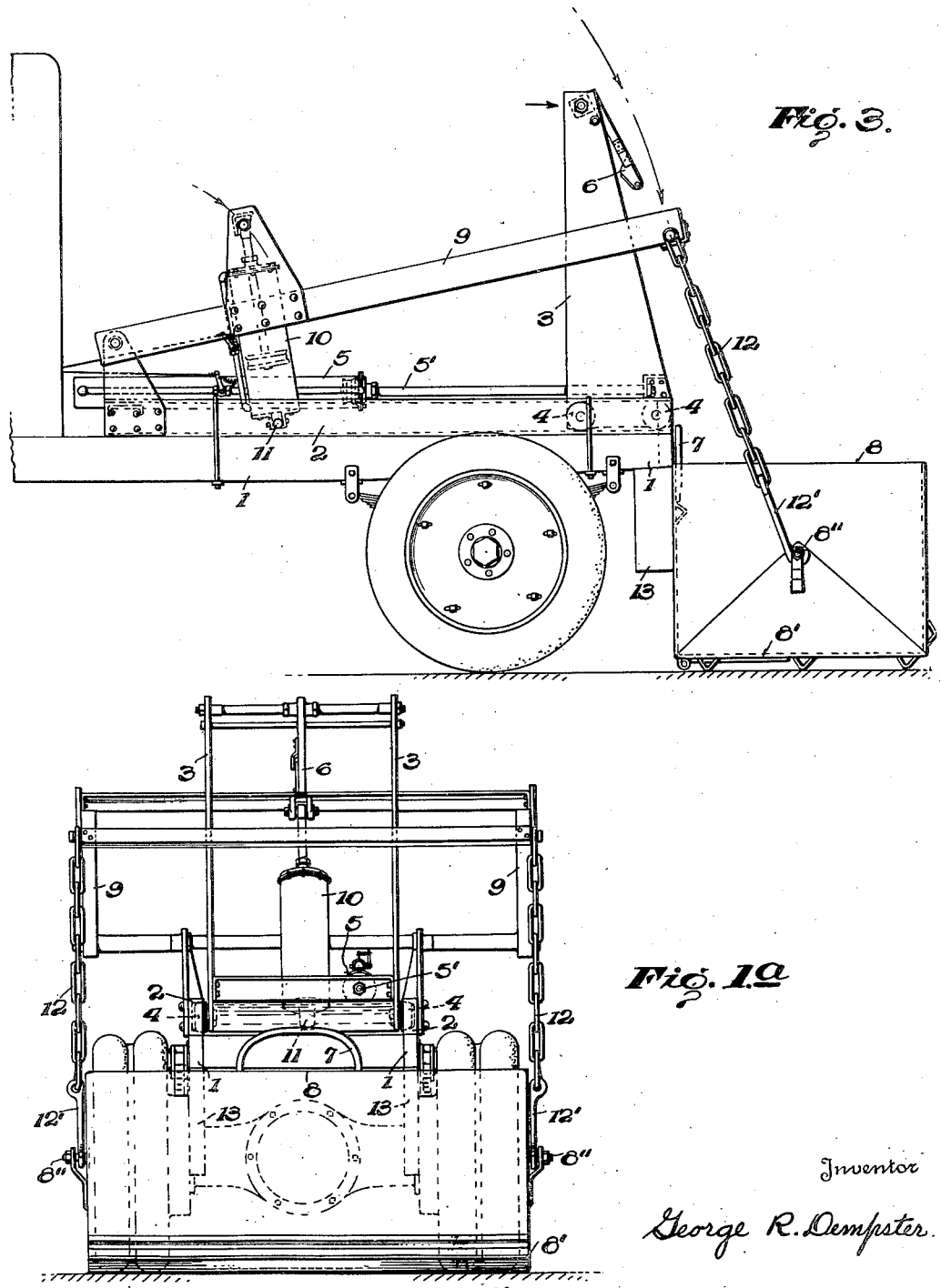

Patented Nov. 14, 1939

2,179,779

UNITED STATES PATENT OFFICE 2,179,779

TRANSPORTING AND DUMPING VEHICLE

George R. Dempster, Knoxville, Tenn.

Application August 5, 1938, Serial No. 223,348

10 Claims. (Cl. 214—77)

This invention relates to transporting and dumping devices, and has for its object to simplify the construction and operation of such devices and to place the load on said device during transportation over or forward of the axle of the truck or other vehicle upon which the device is mounted.

The inventive idea is capable of receiving a variety of mechanical expressions, one of which for the purpose of illustrating the invention, is shown in the accompanying drawings, in which—

Fig. 1a is a rear end elevation of Fig. 1;

Fig. 3 is a side elevation with the parts in the position which they occupy when the loaded container is on the ground and about to be elevated to transporting position on the truck.

Figure 1:
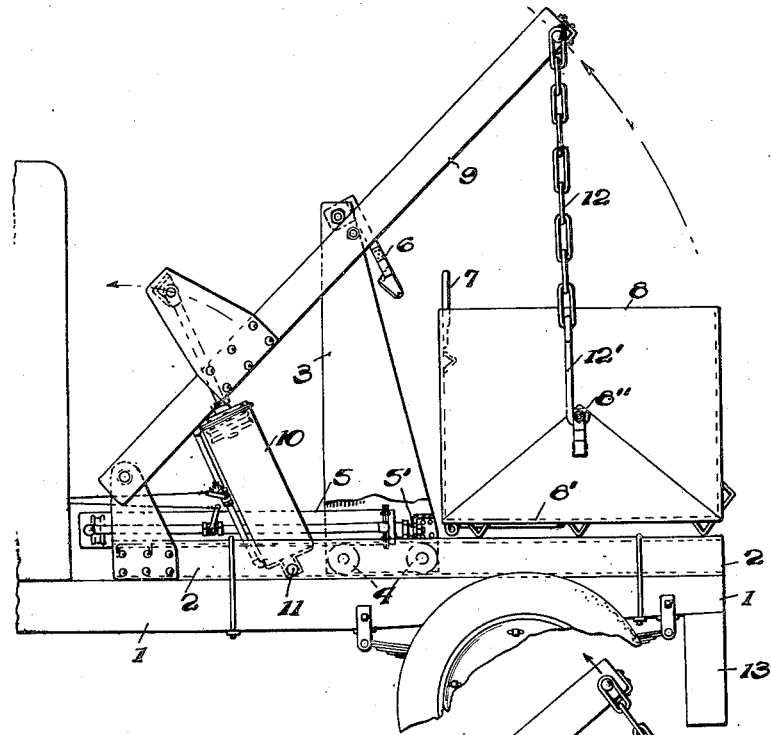
Fig. 1 is a side elevation of the invention with the parts in transporting position.

Referring to the drawings, in which like reference numerals indicate like parts throughout the several views, 1—1 indicate side rails of a truck chassis, 2—2 indicate angle bars, here shown as in the form of channel bars mounted upon and secured to said chassis rails 1—1 in any suitable way, with the angle face of the angle bars facing inward, as clearly shown in Fig. 1a. These angle bars 2—2 constitute a track or way extending forwardly from the rear end of the truck, and mounted on this track or way is an upwardly extending and preferably somewhat forwardly inclined skid frame 3, the skid frame being mounted on rollers 4—4 traveling along the track or way constituted by the angle bars 2—2. Suitable power mechanism, here shown as a horizontal cylinder 5, is mounted on the truck chassis forward of the skid 3 with the piston rod 5' thereof connected to the skid in such a way that the skid will be positioned at the rear end of the track bars 2, 2, and the chassis rail 1—1, when the piston rod is extended but when the piston rod is moved inward, i. e., forward of the truck, the skid frame 3 will occupy the position shown in Fig. 1.

The skid has an automatic hook or catch 6 mounted at or near the top thereof in position to engage a bail 7 on the container 8 when said container is elevated to a point where its bottom portion is just above the rails 2—2 on the track or way. This hook or catch is of such construction that when the container reaches the position shown in Fig. 2 the hook engages and supports the container. If, however, the container be slightly further raised and then lowered the bail 7 passes the engaging end of the catch or hook 6 and is free to be lowered.

Pivotally supported on the chassis rails 1—1 well forward of the rear end of the chassis is a boom composed of a pair of oppositely disposed parallel boom arms 9, which boom has pivotally connected thereto the piston rod of a cylinder 10, the lower end of which cylinder is also pivotally mounted, as at 11, on the angle bars 2—2. When the boom 9 is in elevated position, the cylinder 10 is forwardly inclined on the truck, as shown in Fig. 1, but when the boom is lowered into the position shown in Fig. 3 the cylinder 10 is preferably in a substantially vertical position.

Suspended from the rear end of the boom 9 are chains 12—12 having means, as hooks 12'—12', for engaging the ends of the container for the purpose of elevating the same. The container as here shown is one of the type having a drop bottom door 8', and when such a container is employed, the hooks 12'—12' engage projecting lugs 8'' on the door 8' and hold the same closed during elevating operations, and in fact at all times except when the bail 7 is engaged by the hook or catch 6. When the bail is so engaged the container is supported on the skid 3 by the catch or hook 6 independent of the boom 9 and engaging chains 12, and in this condition if the boom 9 is lowered the bottom door 8' of the container drops down under the influence of gravity and dumps such load, as is clearly shown in Fig. 2.

The rear end of the truck chassis is provided with members 13—13 extending downwardly from the rear end of the chassis rails 1, and this extension, together with the rear ends of the chassis rails 1 and the rear ends of the angle irons 2—2 of the track or way constitute a stationary part of a skid upward and along which the container is elevated, the rear face of the skid 3 constituting a movable part, as heretofore described.

Figure 2:
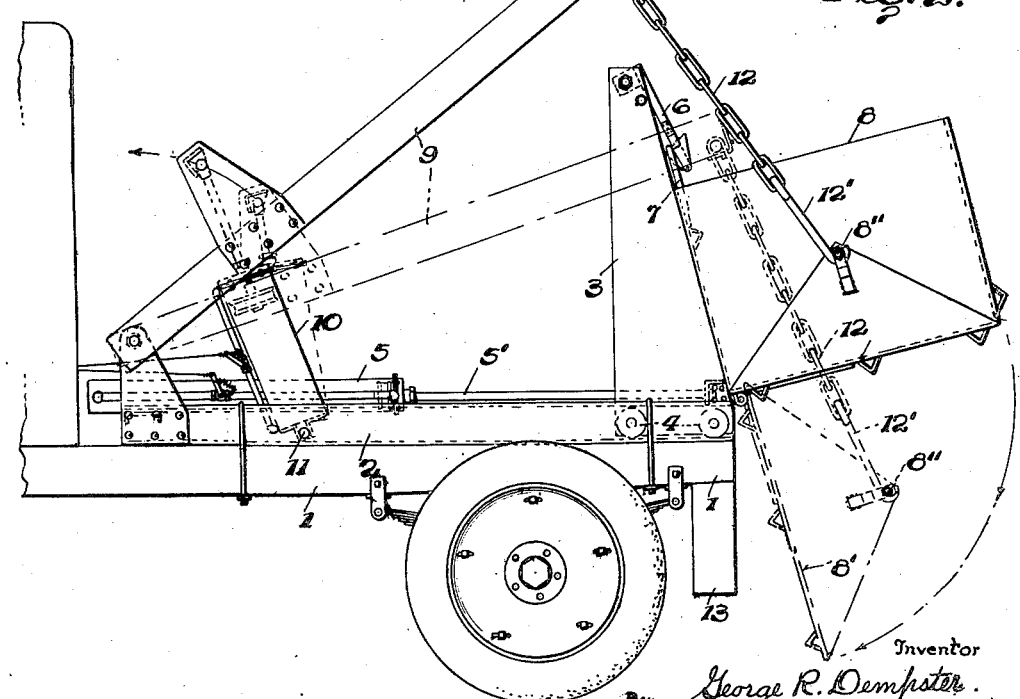
Fig. 2 is a side elevation with the parts in dumping position.

Referring to Fig. 3, when the container is on the ground and it is desired to elevate the same with its load, the boom 9 is lowered in the position shown in Fig. 3, and hooks 12' on the chains 12 are engaged with the container, and power, preferably oil under pressure, is admitted to the lower end of the cylinder 10, whereby the boom 9 is elevated into the position shown in Fig. 2, and the container raised to a point just above the track or way constituted by the angle bars 2—2, and the hook or catch 6 engages the bail 7. With the parts in this position oil under pressure is admitted to the rear end of the cylinder 5 and the skid is drawn forward on the truck along the track or way composed of the angle bars 2—2, from the position shown in Figs. 2 and 3 to the position shown in Fig. 1. When this position is reached the boom may be slightly raised, thus slightly elevating the container and freeing it from the hook or catch 6, whereupon it may be lowered into the position shown in Fig. 1 and the container deposited on the upper surface of the track rails 2—2. In this position the load is preferably over or nearly over the rear axle of the truck and in an ideal position for transportation.

When the dumping position is reached, the piston in the cylinder 5 is moved rearward thereby moving the skid 3 rearward and pushing the container along said track or way until it occupied the position shown in Fig. 2. In this position the container is slightly raised by the boom until the bail 7 is engaged by the hook or catch 6. Thereupon the further lowering of the boom permits the bottom door 8' of the container to drop open and dump the load.

The load being dumped, the truck is moved to the point where the container is to be refilled and it is lowered to the ground as shown in Fig. 3.

While for the purpose of illustrating the invention cylinders 5 and 10 are here shown as the power mechanism for moving the skid and for controlling the elevating and lowering movements of the boom, it will be understood that such cylinders are illustrative of any suitable power mechanism for performing this function, and that the invention is not limited to the specific illustration shown.

It will be further understood that the flow of oil under pressure in the cylinders 5 and 10 is under control of the operator by any suitable valve mechanism, which valve mechanism is not here shown, as the specific construction of the same does not constitute any part of the present invention.

It is to be understood that by the term "angle bar" as herein used is meant a bar having longitudinally extending members thereof arranged at an angle one to the other, so that in a cross section of a bar the members would be shown as arranged at an angle to each other.

Having thus described the invention, what is claimed is:

1. In a transporting vehicle, the combination of a track or way extending forward from the rear end of the vehicle above and across the rear axle thereof, an upwardly extending skid movable forward and backward along said track or way, power means for imparting said movements, a boom pivoted forward of said track and extending rearward to said skid, means for swinging said boom on its pivot, a container movable up and down in contact with said skid, and connections from the rear end of said boom to said container whereby said container is elevated along said skid.

2. In a transporting vehicle, the combination of a pair of bars extending forward from the rear end of the chassis of a truck, an upwardly extending skid movable forward and backward along said bars, means for imparting said movements thereto, a vertically swinging boom pivoted at the forward part of said bars, means for swinging said boom on its pivot, a container movable up and down in contact with said skid, flexible connections between said boom and container whereby said container is elevated along said skid, and skid members, pivoted to and extending downward from the rear ends of said bars.

3. In a transporting and dumping vehicle, the combination of a truck chassis, inwardly facing angle bars mounted on the side rails of the chassis, an upwardly extending skid having rollers at its base traveling along said angle bars as a track or way, a power cylinder imparting movement to said skid along said track or way, a boom pivoted on the chassis forward of said track or way, a power cylinder pivotally connected to the chassis and to said boom, a container movable up and down in contact with said skid, and flexible connections between the rear end of the boom and said container whereby said container is elevated along said skid.

4. In a transporting and dumping vehicle, the combination of a truck chassis, a boom pivoted thereto forward of the rear end of the chassis and swinging in a vertical plane, an upwardly extending skid mounted to travel back and forth across and above the rear axle of the truck, means for imparting said movements thereto, a container, means connecting the rear end of the boom to said container, and means on the skid engaging and supporting said container in elevated position on the skid.

5. In a transporting vehicle, the combination of a track or way extending from the rear end of the vehicle forward over the rear axle thereof, an upwardly extending skid mounted to move along said track or way, power means for imparting movement thereto, a boom pivoted at one end on the vehicle, a container moving up and down on said skid, means connecting said boom to the container, and means for moving said boom about its axis.

6. In a transporting vehicle, the combination of an upwardly extending skid, a container movable along said skid, means moving the skid forwardly over the rear axle of the vehicle, and a pivoted power actuated boom elevating the container along said skid.

7. In a transporting and dumping vehicle, the combination of a truck chassis, a boom pivoted thereto forward of the rear end of the chassis and swinging in a vertical plane extending longitudinally of the vehicle, an upwardly extending skid mounted to move forwardly above the rear axle of the truck, means for imparting said movement thereto, a container moving up and down along said skid, and means connecting said boom to said container.

8. In a transporting vehicle, the combination of an upwardly extending skid, a drop bottom container movable along said skid, means moving the skid over the rear axle of the vehicle, and a power actuated boom connected to the drop bottom of the container and elevating the container along said skid.

9. In a transporting vehicle, the combination of an upwardly extending skid, a container movable along said skid, means moving the skid over the rear axle of the vehicle, a power actuated boom elevating the container along said skid, and means engaging and supporting the container in elevated position on the skid.

10. In a transporting vehicle, the combination of a truck chassis, a power-actuated boom comprising two parallel arms pivoted on the vehicle forward of the rear end of the chassis and swinging in vertical planes extending longitudinally of the vehicle, an upwardly extending skid mounted on the rear of the vehicle, a container sliding on said skid and having a drop bottom, a container-engaging catch on the upper part of said skid, and means connecting the arms of the boom with opposite ends of the drop bottom of the container.

GEORGE R. DEMPSTER.